US010442417B2

(12) United States Patent
Matsunaga et al.

(10) Patent No.: US 10,442,417 B2
(45) Date of Patent: Oct. 15, 2019

(54) HYDRAULIC PRESSURE GENERATION APPARATUS

(71) Applicant: AUTOLIV NISSIN BRAKE SYSTEMS JAPAN CO., LTD., Ueda, Nagano (JP)

(72) Inventors: Yoshiteru Matsunaga, Nagano (JP); Kouji Sakai, Nagano (JP); Nobuyuki Kobayashi, Nagano (JP)

(73) Assignee: AUTOLIV NISSIN BRAKE SYSTEMS JAPAN CO., LTD., Ueda, Nagano (JP)

( * ) Notice: Subject to any disclaimer, the term of this patent is extended or adjusted under 35 U.S.C. 154(b) by 311 days.

(21) Appl. No.: 15/388,272

(22) Filed: Dec. 22, 2016

(65) Prior Publication Data
US 2017/0182992 A1 Jun. 29, 2017

(30) Foreign Application Priority Data

Dec. 24, 2015 (JP) .................................. 2015-252676
Dec. 24, 2015 (JP) .................................. 2015-252678

(51) Int. Cl.
*B60T 13/74* (2006.01)
*B60T 17/02* (2006.01)
(Continued)

(52) U.S. Cl.
CPC ............ *B60T 13/745* (2013.01); *B60T 8/368* (2013.01); *B60T 8/4081* (2013.01); *B60T 13/142* (2013.01); *B60T 17/02* (2013.01)

(58) Field of Classification Search
CPC ...... B60T 13/745; B60T 8/4081; B60T 8/368; B60T 8/3685; B60T 13/142;
(Continued)

(56) References Cited

U.S. PATENT DOCUMENTS 9,381,901 B2 * 7/2016 Kobayashi ............ B60T 13/662
9,527,485 B2 * 12/2016 Nakamura .............. B60T 11/16
(Continued)

FOREIGN PATENT DOCUMENTS

CN 202827534 3/2013
CN 104203669 12/2014
(Continued)

OTHER PUBLICATIONS

European Search Report in related EP Application No. 16206632.8-1762 dated Mar. 20, 2017, 11 pages.
(Continued)

*Primary Examiner* — Thomas E Lazo
*Assistant Examiner* — Dustin T Nguyen
(74) *Attorney, Agent, or Firm* — Andrew M. Calderon; Roberts Mlotkowski Safran Cole & Calderon, P.C.

(57) ABSTRACT

One embodiment provides a hydraulic pressure generation apparatus. In the hydraulic pressure generation apparatus, a motor attached to a base body. The base body includes: a first cylinder hole having a closed bottom in which a first piston is inserted to thereby form a master cylinder; and a second cylinder hole having a closed bottom in which a second piston is inserted to thereby form a slave cylinder. The first cylinder hole and the second cylinder hole have respective openings in a surface of the base body located on one side thereof. Axial lines of the first cylinder hole, the second cylinder hole and an output shaft of the motor are arranged approximately parallel with each other.

16 Claims, 7 Drawing Sheets

(51) Int. Cl.
   *B60T 13/14* (2006.01)
   *B60T 8/36* (2006.01)
   *B60T 8/40* (2006.01)

(58) Field of Classification Search
   CPC ...... B60T 13/143; B60T 13/145; B60T 11/16;
   B60T 13/662; B60T 7/042
   USPC .................................................. 60/562, 545
   See application file for complete search history.

(56) References Cited

U.S. PATENT DOCUMENTS

| | | | |
|---|---|---|---|
| 9,764,723 B2 * | 9/2017 | Maruo | B60T 8/368 |
| 9,975,532 B2 * | 5/2018 | Matsunaga | B60T 11/16 |
| 2013/0333376 A1 * | 12/2013 | Murayama | B60T 7/042 |
| | | | 60/545 |
| 2014/0225425 A1 | 8/2014 | Drumm et al. | |
| 2015/0061364 A1 | 3/2015 | Murayama et al. | |
| 2015/0158466 A1 | 6/2015 | Nakamura et al. | |
| 2015/0158474 A1 | 6/2015 | Matsunaga et al. | |
| 2015/0183414 A1 | 7/2015 | Kobayashi et al. | |
| 2015/0224972 A1 | 8/2015 | Feigel | |
| 2016/0121864 A1 * | 5/2016 | Misunou | B60T 7/042 |
| | | | 60/591 |
| 2016/0272183 A1 | 9/2016 | Kobayashi et al. | |

FOREIGN PATENT DOCUMENTS

| | | |
|---|---|---|
| CN | 104640752 | 5/2015 |
| CN | 104691526 | 6/2015 |
| EP | 2889195 A1 | 7/2015 |
| JP | 59228323 | 12/1984 |
| JP | 63190954 | 8/1988 |
| JP | H08002391 | 1/1996 |
| JP | 2014525875 | 10/2014 |
| JP | 2015020448 A | 2/2015 |
| JP | 2015093557 | 5/2015 |
| JP | 2015107750 | 6/2015 |
| JP | 2015123932 | 7/2015 |
| JP | 2015123934 | 7/2015 |
| WO | 2013147250 | 12/2015 |

OTHER PUBLICATIONS

Japanese Office Action in related JP Application No. 2015-252678 dated Feb. 13, 2018, 7 pages.
Japanese Office Action in related JP Application No. 2015-252676 dated Jan. 9, 2018, 9 pages.
Chinese Office Action in related CN Application No. 201611205441.0 dated Jun. 10, 2019, 17 pages.

* cited by examiner

HYDRAULIC PRESSURE GENERATION APPARATUS

CROSS-REFERENCE TO RELATED APPLICATION(S)

This application claims priorities from Japanese Patent Applications No. 2015-252676 filed on Dec. 24, 2015, and No. 2015-252678 filed on Dec. 24, 2015, the entire contents of which are incorporated herein by reference.

FIELD

An aspect of the present invention relates to a hydraulic pressure generation apparatus that is used in a vehicular brake system.

BACKGROUND

Among hydraulic pressure generation apparatus that generate a brake hydraulic pressure according to a stroke length (action length) of a brake pedal is one that is equipped with a master cylinder for generating a brake hydraulic pressure by a piston linked to the brake pedal, a stroke simulator for giving a simulated manipulation reaction force to the brake pedal by a piston that is urged, and a slave cylinder for generating a brake hydraulic pressure by a piston having a motor as a drive source.

In an example of the above-type of hydraulic pressure generation apparatus, the master cylinder, the stroke simulator, and the slave cylinder are provided in a single base body (refer to JP-2014-525875-A, for example).

In this conventional hydraulic pressure generation apparatus, cylinder holes of the master cylinder and the stroke simulator have respective openings in a rear surface of the base body and a cylinder hole of the slave cylinder has an opening in a right side surface of the base body.

Thus, the cylinder holes are formed by machining from different directions and various components are set in the cylinder holes from different directions. This means a problem that manufacture of this conventional hydraulic pressure generation apparatus requires complicated steps of work.

Furthermore, in this conventional hydraulic pressure generation apparatus, since the two cylinder holes of the master cylinder and the stroke simulator have respective openings in a rear surface of the base body and the cylinder hole of the slave cylinder has an opening in a right side surface of the base body, the brake pedal is disposed on the side of the rear surface of the base body and the motor is attached to the right side surface of the base body. And a right side portion of the base body is provided with a drive power transmission unit for inputting, to the slave cylinder, motive power that originates from rotational drive power of the output shaft of the motor. Thus, the one side portion of the base body is made large and the motor projects to a large extent from the one side surface of the base body. This means a problem that it is difficult to secure a space for installation of the hydraulic pressure generation apparatus in a vehicle.

SUMMARY

One object of the present invention is to solve part of the above problems and thereby provide a hydraulic pressure generation apparatus capable of increasing the efficiency of machining work for forming cylinder holes in a base body and the efficiency of mounting of various components.

To attain the above object, one aspect of the invention provides
 a hydraulic pressure generation apparatus, including:
  a base body;
  a motor attached to the base body;
  a master cylinder which generates a brake hydraulic pressure by a first piston which is linked to a brake manipulator; and
  a slave cylinder which generates a brake hydraulic pressure by a second piston which has the motor as a drive source,
  wherein the base body includes:
   a first cylinder hole having a closed bottom in which the first piston is inserted; and
   a second cylinder hole having a closed bottom in which the second piston is inserted,
  wherein the first cylinder hole and the second cylinder hole have respective openings in a surface of the base body located on one side thereof, and
  wherein an axial line of the first cylinder hole, an axial line of the second cylinder hole, and an axial line of an output shaft of the motor are arranged approximately parallel with each other.

With this configuration, the cylinder holes of the master cylinder and the slave cylinder have the respective openings on the same side. As a result, the two cylinder holes can be formed in the base body by machining from one direction and various components can be set in the two cylinder holes from one direction, whereby the efficiency of manufacture of the hydraulic pressure generation apparatus can be made high.

Since the axial line of the first cylinder hole, the axial line of the second cylinder hole, and the axial line of the output shaft of the motor are arranged approximately parallel with each other, the first cylinder hole, the second cylinder hole, and the motor can be arranged in a well-balanced manner.

There may be provided
 the hydraulic pressure generation apparatus, further including:
  a stroke simulator which gives a simulated manipulation reaction force to the brake manipulator by a third piston in an urged state,
  wherein the base body further includes a third cylinder hole having a closed bottom in which the third piston is inserted,
  wherein the third cylinder hole has an opening in the surface of the base body located on the one side thereof, and
  wherein an axial line of the third cylinder hole is approximately parallel with the axial line of the first cylinder hole.

With this configuration, since the three cylinder holes of the master cylinder, the slave cylinder, and the stroke simulator have the respective openings on the same side, the efficiency of machining work for forming the three cylinder holes in the base body and the efficiency of mounting of various components can be increased.

There may be provided
 the hydraulic pressure generation apparatus,
 wherein the third cylinder hole is disposed beside the first cylinder hole.

With this configuration, the master cylinder can be linked to the stroke simulator easily. The master cylinder and the stroke simulator can be disposed compactly and hence the hydraulic pressure generation apparatus can be miniaturized.

There may be provided
 the hydraulic pressure generation apparatus, wherein the second cylinder hole and the output shaft are disposed above or below the first cylinder hole.

With this configuration, since the second cylinder hole and the motor are disposed above or below the first cylinder hole, the master cylinder, the slave cylinder, and the motor can be arranged in a well-balanced manner with respect to the base body, whereby the hydraulic pressure generation apparatus can be enhanced in stability and minimized Where the second cylinder hole and the output shaft are disposed below the first cylinder hole in a state that the hydraulic pressure generation apparatus is installed in a vehicle, since the slave cylinder and the motor are located below the master cylinder, the center of gravity of the hydraulic pressure generation apparatus can be set low. In particular, since the motor is a heavy component, disposing the motor at a low position in the hydraulic pressure generation apparatus can enhance its stability effectively.

There may be provided
the hydraulic pressure generation apparatus,
wherein the output shaft is disposed beside the second cylinder hole.

With this configuration, it is possible to stabilize the weight balance of the master cylinder, the slave cylinder, and the motor.

There may be provided
the hydraulic pressure generation apparatus,
wherein the output shaft projects from the motor toward the one side.

Where the output shaft of the motor projects toward the same side as the side on which the openings of the cylinder holes are formed, various components can be set in or attached to the cylinder holes and the output shaft from one direction and hence the efficiency of manufacture of the hydraulic pressure generation apparatus can be increased.

There may be provided
the hydraulic pressure generation apparatus,
wherein the surface of the base body located on the one side thereof includes a vehicle body attachment surface and a drive power transmission unit attachment surface,
wherein a drive power transmission unit which converts rotational drive power of the output shaft into straight axial power for the second piston is attached to the drive power transmission unit attachment surface, and
wherein the drive power transmission unit attachment surface is located on the other side as compared with the vehicle body attachment surface.

With this configuration, when the vehicle body attachment surface of the base body is attached to a vehicle body, the drive power transmission unit can be set between a vehicle-body-side component such as a dashboard and the drive power transmission unit attachment surface of the base body. Thus, a space for installation of the hydraulic pressure generation apparatus in the vehicle can be secured easily.

There may be provided
the hydraulic pressure generation apparatus,
wherein a flange projects from the base body,
wherein a surface of the flange located on the one side thereof includes the drive power transmission unit attachment surface, and
wherein the motor is attached to a surface of the flange located on the other side thereof.

With this configuration, the motor and the drive power transmission unit can be arranged in a well-balanced manner with respect to the base body, whereby the stability of the hydraulic pressure generation apparatus can be enhanced.

There may be provided
the hydraulic pressure generation apparatus,
wherein a housing of a control device which controls the motor is attached to the base body, and
wherein the housing is disposed above or below the second cylinder hole.

Arranging the housing and the slave cylinder in the top-bottom direction in this manner makes it possible to miniaturize the hydraulic pressure generation apparatus.

In the hydraulic pressure generation apparatus according to the one aspect of the invention, the efficiency of machining work for forming the cylinder holes in the base body and the efficiency of mounting of various components can be increased, whereby the efficiency of manufacture of the hydraulic pressure generation apparatus can be increased. Since the cylinder holes and the motor can be arranged in a well-balanced manner, the hydraulic pressure generation apparatus can be miniaturized.

Another object of the invention is to solve the other part of the above problems and thereby provide a hydraulic pressure generation apparatus that makes it easier to secure installation of itself in a vehicle.

To attain the above object, another aspect of the invention provides
a hydraulic pressure generation apparatus, including:
a base body;
a slave cylinder which generates a brake hydraulic pressure by a second piston which has the motor as a drive source,
wherein the base body includes:
a first cylinder hole having a closed bottom in which the first piston is inserted; and
a second cylinder hole having a closed bottom in which the second piston is inserted,
wherein an axial line of the first cylinder hole, an axial line of the second cylinder hole, and an axial line of an output shaft of the motor are arranged approximately parallel with each other,
wherein a surface of the base body located on one side thereof includes a vehicle body attachment surface and a drive power transmission unit attachment surface,
wherein a drive power transmission unit which converts rotational drive power of the output shaft into straight axial power for the second piston is attached to the drive power transmission unit attachment surface, and
wherein the drive power transmission unit attachment surface is located on the other side as compared with the vehicle body attachment surface.

With this configuration, when the vehicle body attachment surface of the base body is attached to a vehicle body, the drive power transmission unit can be set between a vehicle-body-side component such as a dashboard and the drive power transmission unit attachment surface of the base body. Thus, a space for installation of the hydraulic pressure generation apparatus in the vehicle can be secured easily.

Since the axial line of the first cylinder hole, the axial line of the second cylinder hole, and the axial line of the output shaft of the motor are arranged approximately parallel with each other, the first cylinder hole, the second cylinder hole, and the motor can be arranged in a well-balanced manner.

There may be provided
the hydraulic pressure generation apparatus,
wherein a flange projects from the base body,
wherein a surface of the flange located on the one side thereof includes the drive power transmission unit attachment surface, and
wherein the motor is attached to a surface of the flange located on the other side thereof, and the output shaft projects from the motor toward the one side.

With this configuration, the motor and the drive power transmission unit can be arranged in a well-balanced manner with respect to the base body, whereby the stability of the hydraulic pressure generation apparatus can be enhanced.

There may be provided
the hydraulic pressure generation apparatus, further including:
a stroke simulator which gives a simulated manipulation reaction force to the brake manipulator by a third piston in an urged state,
wherein the base body further includes a third cylinder hole having a closed bottom in which the third piston is inserted,
wherein an axial line of the third cylinder hole is approximately parallel with the axial line of the first cylinder hole, and
wherein the first cylinder hole, the second cylinder hole, and the third cylinder hole have respective openings in the surface of the base body located on the one side thereof.

With this configuration, the cylinder holes of the master cylinder, the slave cylinder, and the stroke simulator have the respective openings on the same side. As a result, these cylinder holes can be formed in the base body by machining from one direction and various components can be set in these cylinder holes from one direction, the efficiency of machining work for forming the these cylinder holes in the base body and the efficiency of mounting of various components can be increased, whereby the efficiency of manufacture of the hydraulic pressure generation apparatus can be increased.

Where the output shaft of the motor projects on the same side as the openings of these cylinder holes are formed, various components can be set in or attached to the cylinder holes and the output shaft from one direction.

There may be provided
the hydraulic pressure generation apparatus,
wherein the third cylinder hole is disposed beside the first cylinder hole.

With this configuration, the master cylinder can be linked to the stroke simulator easily. The master cylinder and the stroke simulator can be disposed compactly and hence the hydraulic pressure generation apparatus can be miniaturized.

There may be provided
the hydraulic pressure generation apparatus,
wherein the second cylinder hole and the output shaft are disposed above or below the first cylinder hole.

With this configuration, since the second cylinder hole and the motor are disposed above or below the first cylinder hole, the master cylinder in a state that the hydraulic pressure generation apparatus is installed in a vehicle, the slave cylinder, and the motor can be arranged in a well-balanced manner with respect to the base body, whereby the hydraulic pressure generation apparatus can be enhanced in stability and minimized.

Where the second cylinder hole and the output shaft are disposed below the first cylinder hole, since the slave cylinder and the motor are located below the master cylinder, the center of gravity of the hydraulic pressure generation apparatus can be set low. In particular, since the motor is a heavy component, disposing the motor at a low position in the hydraulic pressure generation apparatus can enhance its stability effectively.

There may be provided
the hydraulic pressure generation apparatus,
wherein the output shaft is disposed beside the second cylinder hole.

With this configuration, it is possible to stabilize the weight balance of the master cylinder, the slave cylinder, and the motor.

There may be provided
the hydraulic pressure generation apparatus,
wherein a housing of a control device which controls the motor is attached to the base body, and
wherein the housing is disposed above or below the second cylinder hole.

Arranging the housing and the slave cylinder in the top-bottom direction in this manner makes it possible to miniaturize the hydraulic pressure generation apparatus.

In the hydraulic pressure generation apparatus according to the other aspect of the invention, since the drive power transmission unit can be set between a vehicle-body-side component such as a dashboard and the drive power transmission unit attachment surface of the base body, a space for installation of the hydraulic pressure generation apparatus in the vehicle can be secured easily. The cylinder holes and the motor can be arranged in a well-balanced manner.

DETAILED DESCRIPTION

Figure 1:
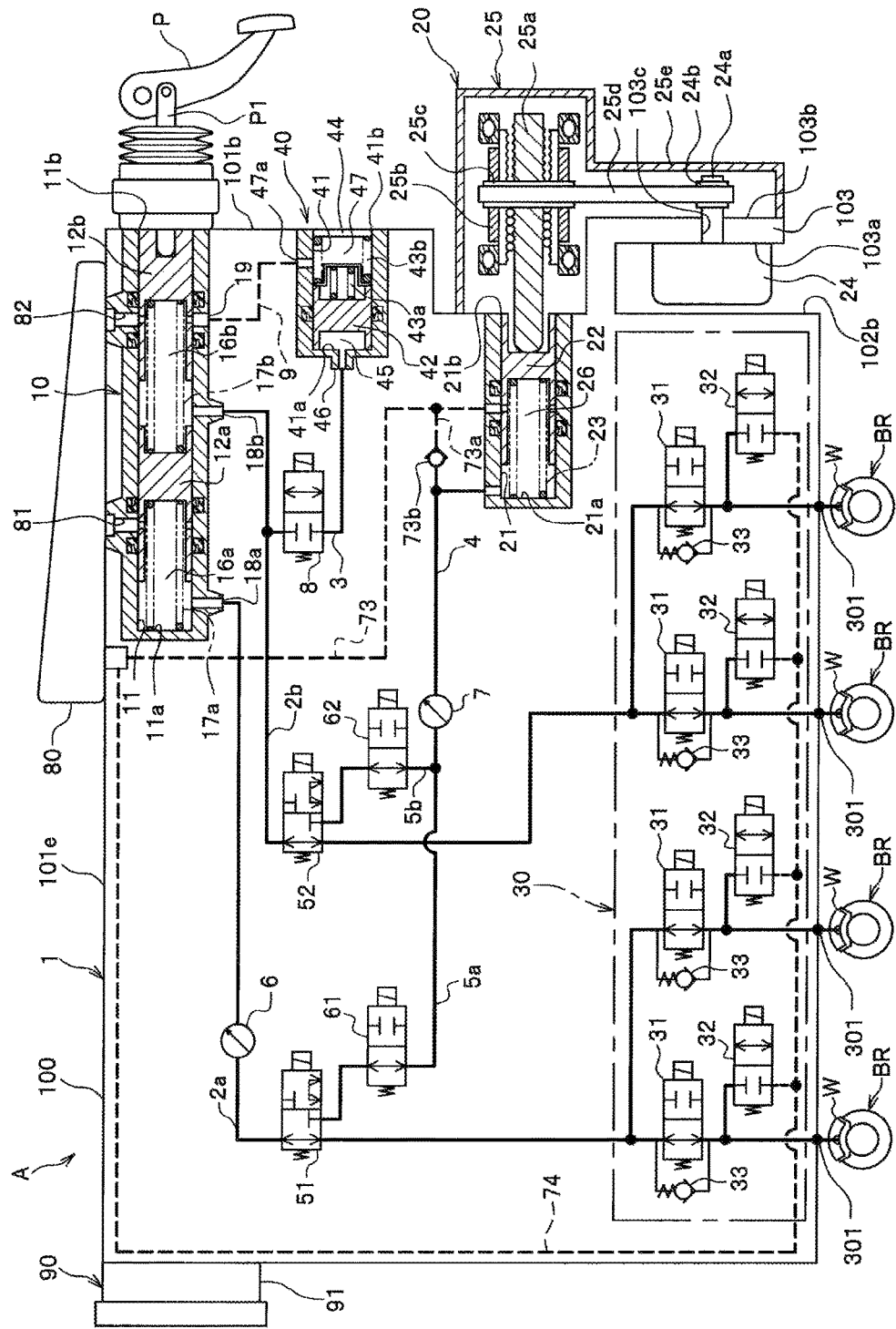
FIG. 1 is a diagram showing the overall configuration of a vehicular brake system that employs a hydraulic pressure generation apparatus according to an embodiment.

An embodiment will be hereinafter described in detail by referring to the drawings when necessary. The embodiment is directed to a hydraulic pressure generation apparatus 1 that is applied to a vehicular brake system A.

As shown in FIG. 1, the vehicular brake system A is equipped with both of a by-wire brake system that operates in starting an engine, an electric motor, or the like and a hydraulic brake system that operates in, for example, stopping the engine, an electric motor, or the like.

The vehicular brake system A can be installed in hybrid vehicles which use both of an engine (internal combustion engine) and a motor, electric vehicles and fuel cell vehicles which use only a motor as a motive power source, and ordinary vehicles which use only an engine as a motive power source.

The vehicular brake system A is equipped with the hydraulic pressure generation apparatus 1 which generates a brake hydraulic pressure according to a stroke length (action length) of a brake pedal P (corresponding to the term "brake manipulator" used in the claims) and assists stabilization of vehicle behavior.

The hydraulic pressure generation apparatus 1 is equipped with a base body 100, a master cylinder 10 for generating a brake hydraulic pressure according to a stroke length of the brake pedal P, a stroke simulator 40 for giving a simulated manipulation reaction force to the brake pedal P, and a slave cylinder 20 for generating a brake hydraulic pressure using a motor 24 as a drive source. The hydraulic pressure generation apparatus 1 is further equipped with a hydraulic control device 30 for assisting stabilization of vehicle behavior by controlling the pressures of brake fluids that act on wheel cylinders W of wheel brakes BR, respectively, an electronic control unit 90 (corresponding to the term "control device" used in the claims), and a reservoir tank 80.

Figure 2:
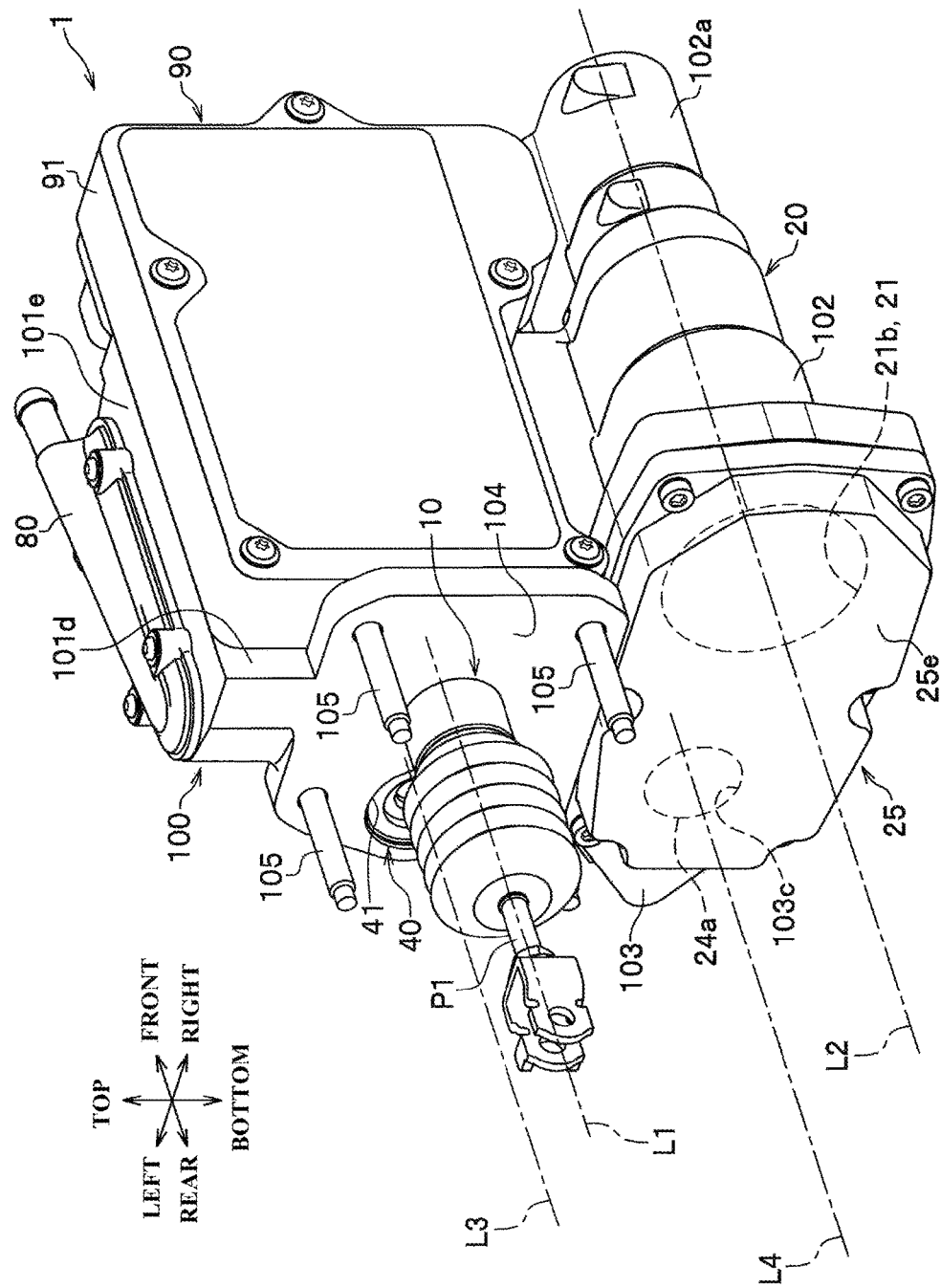
FIG. 2 is a perspective view of the hydraulic pressure generation apparatus according to the embodiment as viewed from a top-rear-right position.

Although the directions that will be used in the following description are ones that are set for the sake of convenience of description of the hydraulic pressure generation apparatus 1, they approximately coincide with directions that occur when the hydraulic pressure generation apparatus 1 is installed in a vehicle. More specifically, as shown in FIG. 2, the forward direction (i.e., the direction toward the front end) is defined as a direction in which a rod P1 is moved when the brake pedal P is stepped on and the rearward direction (i.e., the direction toward the rear end) is defined as a direction in which the rod P1 is moved when the brake pedal P returns. The left-right direction is defined as a horizontal direction that is perpendicular to the movement direction of the rod P1 (front-rear direction).

The base body 100 is a metal block to be mounted in a vehicle (see FIG. 3), and is formed inside with three cylinder holes 11, 21, and 41 and plural hydraulic passages 2*a*, 2*b*, 3, 4, 5*a*, 5*b*, 73, 74, etc. Various components such as a reservoir tank 80 and the motor 24 are attached to the base body 100.

Figure 7:
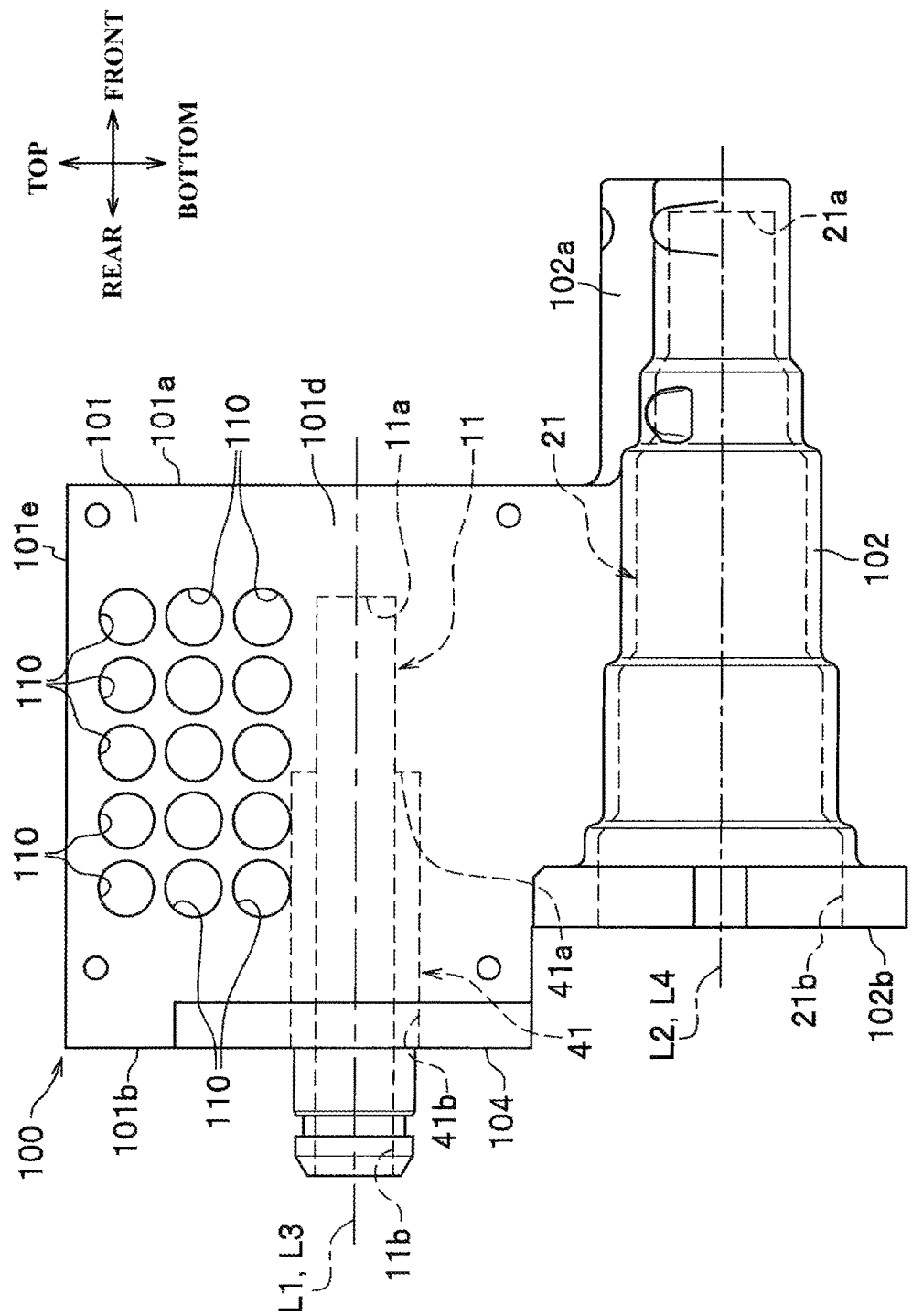
FIG. 7 is a right side view of the base body of the hydraulic pressure generation apparatus according to the embodiment.

As shown in FIG. 7, the base body 100 is formed inside with the first cylinder hole 11, the second cylinder hole 21, and the third cylinder hole 41 each of which is a cylindrical hole having a closed bottom. The first cylinder hole 11, the second cylinder hole 21, and the third cylinder hole 41 extend in the front rear direction, and the axial lines L1, L2, and L3 of the respective cylinder holes 11, 21, and 41 are arranged side by side and parallel with each other. The cylinder holes 11, 21, and 41 have openings at their rear ends in rear surfaces 101*b* and 102*b* of the base body 100.

As shown in FIG. 1, the master cylinder 10 is of a tandem piston type and is equipped of two first pistons 12*a* and 12*b* (secondary piston and primary piston) inserted in the first cylinder hole 11 and two coil springs 17*a* and 17*b* disposed in the first cylinder hole 11.

A bottom-side pressure room 16*a* is formed between a bottom surface 11*a* of the first cylinder hole 11 and the bottom-side first piston 12*a* (secondary piston). The coil spring 17*a* is disposed in the bottom-side pressure room 16*a*. The coil spring 17*a* serves to push back, toward the opening 11*b*, the first piston 12*a* that has been moved toward the bottom surface 11*a*.

An opening-side pressure room 16*b* is formed between the bottom-side first piston 12*a* and the opening-side first piston 12*b* (primary piston). The coil spring 17*b* is disposed in the opening-side pressure room 16*b*. The coil spring 17*b* serves to push back, toward the opening 11*b*, the first piston 12*b* that has been moved toward the bottom surface 11*a*.

The rod P1 of the brake pedal P is inserted in the first cylinder hole 11. A tip portion of the rod P1 is connected to the opening-side first piston 12*b*, which is thereby linked to the brake pedal P by the rod P1.

When receiving a stepping force exerted on the brake pedal P, the two first pistons 12*a* and 12*b* slide in the first cylinder hole 11 and pressurize the brake fluids existing in the bottom-side pressure room 16*a* and the opening-side pressure room 16*b*.

The reservoir tank 80 is a container for supplying brake fluid through reservoir union ports 81 and 82, and is attached to a top surface 101*e* of the base body 100 (see FIG. 2). Two fluid supply portions that project from the bottom surface of the reservoir tank 80 are inserted in the two respective reservoir union ports 81 and 82 which are formed in the top surface 101*e* of the base body 100. Brake fluid is supplied to the bottom-side pressure room 16*a* and the opening-side pressure room 16*b* from the reservoir tank 80 through the reservoir union ports 81 and 82, respectively.

The stroke simulator 40 is equipped with a third piston 42 which is inserted in the third cylinder hole 41, a lid member 44 which closes an opening 41*b* of the third cylinder hole 41, and two coil springs 43*a* and 43*b* which are disposed between the third piston 42 and the lid member 44.

A pressure room 45 is formed between a bottom surface 41*a* of the third cylinder hole 41 and the third piston 42. The pressure room 45 formed in the third cylinder hole 41 communicates with the opening-side pressure room 16*b* of the first cylinder hole 11 via a branch hydraulic passage 3 and part of a second main hydraulic passage 2*b* (described later).

In the stroke simulator 40, the third piston 42 is moved against the urging forces of the coil springs 43*a* and 43*b* by a brake hydraulic pressure generated in the opening-side pressure room 16*b* of the master cylinder 10. The third piston 42 thus urged gives a simulated manipulated reaction force to the brake pedal P.

The slave cylinder 20 is of a single piston type, and is equipped with a second piston 22 which is inserted in the second cylinder hole 21, a coil spring 23 which is disposed in the second cylinder hole 21, a motor 24, and a drive power transmission unit 25.

A pressure room 26 is formed between a bottom surface 21*a* of the second cylinder hole 21 and a second piston 22. A coil spring 23 is disposed in the pressure room 26, and serves to push back, toward an opening 21*b*, the second piston 22 that has been moved toward the bottom surface 21*a*.

The motor 24 is an electric servo motor which is drive-controlled by the electronic control unit 90 (described later). An output shaft 24*a* projects rearward from a central portion of the rear surface of the motor 24.

Figure 4:
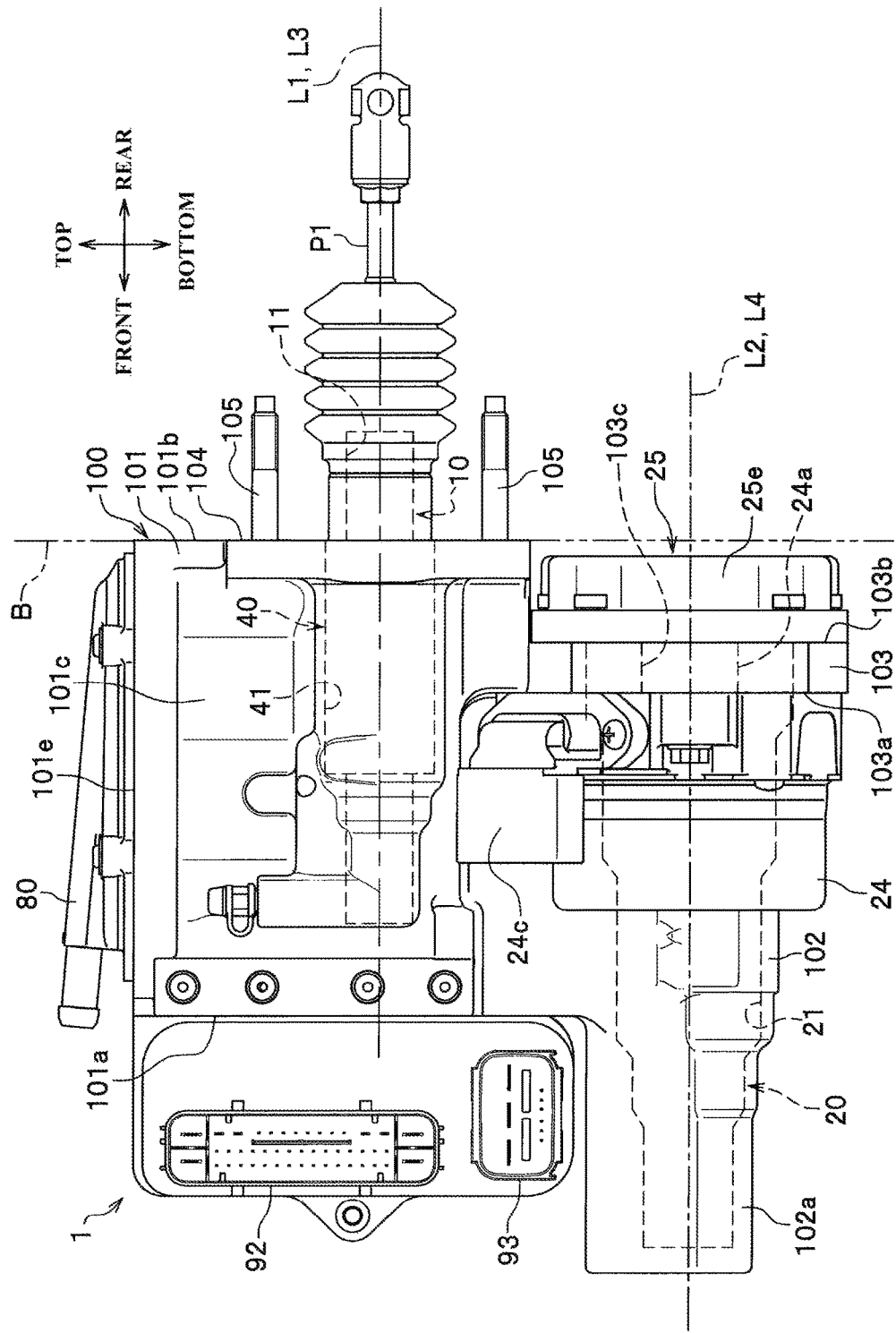
FIG. 4 is a left side view of the hydraulic pressure generation apparatus according to the embodiment.

As shown in FIG. 4, the motor 24 is attached to the front surface of a flange 103 of the base body 100. The output shaft 24*a* is inserted through an insertion hole 103*c* which is formed through the flange 103, and projects rearward past the flange 103. A drive-side pulley 24*b* is attached to a rear end portion of the output shaft 24*a*.

The drive power transmission unit 25 is a mechanism for converting rotational drive power of the output shaft 24*a* of the motor 24 into straight axial power.

The drive power transmission unit 25 is equipped with a rod 25*a*, a cylindrical nut member 25*b* which surrounds the rod 25*a*, a driven-side pulley 25*c* which is attached to the nut member 25*b* around its entire circumference, an endless belt 25*d* which is wound on the driven-side pulley 25*c* and the drive-side pulley 24*b*, and a cover member 25*e*.

A front portion of the rod 25*a* is inserted in the second cylinder hole 21 through its opening 21*b*, and the front end of the rod 25*a* contacts the second piston 22. A rear portion of the rod 25*a* projects rearward past the rear surface 102*b* of the base body 100.

A ball screw mechanism is provided between the outer circumferential surface of a rear portion of the rod 25*a* and the inner circumferential surface of the nut member 25*b*. The nut member 25*b* is fixed to the base body 100 via a bearing.

When the output shaft 24a is rotated, its rotational drive power is input to the nut member 25b via the drive-side pulley 24b, the belt 25d, and the driven-side pulley 25c. Straight axial power is given to the rod 25a by means of the ball screw mechanism provided between the nut member 25b and the rod 25a, whereby the rod 25a advances or retreats in the front-rear direction.

When the rod 25a is moved forward, the second piston 22 is pushed by the rod 25a. As a result, the second piston 22 slides in the second cylinder hole 21 and pressurizes the brake fluid existing in the pressure room 26.

Next, the hydraulic passages formed in the base body 100 will be described. As shown in FIG. 1, the two main hydraulic passages 2a and 2b are hydraulic passages that originate from the first cylinder hole 11 of the master cylinder 10.

The first main hydraulic passage 2a leads from the bottom-side pressure room 16a of the master cylinder 10 to two wheel brakes BR via the hydraulic control device 30.

The second main hydraulic passage 2b leads from the opening-side pressure room 16b of the master cylinder 10 to the other two wheel brakes BR via the hydraulic control device 30.

The branch hydraulic passage 3 is a hydraulic passage that leads from the pressure room 45 of the stroke simulator 40 to the second main hydraulic passage 2b. The branch hydraulic passage 3 is provided with a normally closed solenoid valve 8, which serves to open or close the branch hydraulic passage 3.

The two communication passages 5a and 5b are hydraulic passages that merge into a common hydraulic passage 4 which originates from the second cylinder hole 21 of the slave cylinder 20.

The first communication passage 5a is a flow passage that leads from the common hydraulic passage 4 to the first main hydraulic passage 2a. The second communication passage 5b is a flow passage that leads from the common hydraulic passage 4 to the second main hydraulic passage 2b.

A first switching valve 51 which is a three-directional valve is disposed at a connection point of the first main hydraulic passage 2a and the first communication passage 5a. The first switching valve 51 is a two-position, three-port solenoid valve.

In a state that the first switching valve 51 is at a first position shown in FIG. 1, the upstream side (master cylinder 10 side) and the downstream side (vehicle brake BR side) of the first main hydraulic passage 2a communicate and the first main hydraulic passage 2a and the first communication passage 5a do not.

In a state that the first switching valve 51 is at a second position, the upstream side and the downstream side of the first main hydraulic passage 2a do not communicate and the first communication passage 5a and the downstream side of the first main hydraulic passage 2a communicate.

A second switching valve 52 which is a three-directional valve is disposed at a connection point of the second main hydraulic passage 2b and the second communication passage 5b. The second switching valve 52 is a two-position, three-port solenoid valve.

In a state that the second switching valve 52 is at a first position shown in FIG. 1, the upstream side (master cylinder 10 side) and the downstream side (vehicle brake BR side) of the second main hydraulic passage 2b communicate and the second main hydraulic passage 2b and the second communication passage 5b do not.

In a state that the second switching valve 52 is at a second position, the upstream side and the downstream side of the second main hydraulic passage 2b do not communicate and the second communication passage 5b and the downstream side of the second main hydraulic passage 2b communicate.

The first communication passage 5a is provided with a first shutoff valve 61. The first shutoff valve 61 is a normally open solenoid valve. When the first shutoff valve 61 is closed being energized, the first communication passage 5a is shut off by the first shutoff valve 61.

The second communication passage 5b is provided with a second shutoff valve 62. The second shutoff valve 62 is a normally open solenoid valve. When the second shutoff valve 62 is closed being energized, the second communication passage 5b is shut off by the second shutoff valve 62.

Two pressure sensors 6 and 7 each serve to detect the magnitude of a brake hydraulic pressure, and pieces of information acquired by the pressure sensors 6 and 7 are output to the electronic control unit 90.

The first pressure sensor 6 is disposed upstream of the first switching valve 51 and detects a brake hydraulic pressure occurring in the master cylinder 10.

The second pressure sensor 7, which is disposed downstream of the second switching valve 52, detects a brake hydraulic pressure when the communication passages 5a and 5b communicate with the downstream sides of the main hydraulic passages 2a and 2b, respectively.

The slave cylinder supply passage 73 is a hydraulic passage that leads from the reservoir tank 80 to the slave cylinder 20, and is connected to the common hydraulic passage 4 by a branch supply passage 73a.

The branch supply passage 73a is provided with a check valve 73b that allows only inflow of brake fluid from the reservoir tank 80 to the common hydraulic passage 4.

During an ordinary operation, brake fluid is supplied from the reservoir tank 80 to the slave cylinder 20 through the slave cylinder supply passage 73.

During a fluid suction control, brake fluid is sucked from the reservoir tank 80 to the slave cylinder 20 through part of the slave cylinder supply passage 73, the branch supply passage 73a, and part of the common hydraulic passage 4.

The return hydraulic passage 74 is a hydraulic passage that leads from the hydraulic control device 30 to the reservoir tank 80. Brake fluid that has escaped from the wheel cylinders W via the hydraulic control device 30 flows into the return hydraulic passage 74. The brake fluid that has escaped to the return hydraulic passage 74 is returned to the reservoir tank 80 through the return hydraulic passage 74.

The hydraulic control device 30 serves to control, as appropriate, the pressure of brake fluid that acts on the wheel cylinder W of each wheel brake BR. The hydraulic control device 30 is configured so as to be able to perform an antilock brake control. The wheel cylinders W are connected to output ports 301 of the base body 100 by pipes, respectively.

The hydraulic control device 30 can raise, maintain, or lower the hydraulic pressure (wheel cylinder pressure) that acts on each wheel cylinder W. The hydraulic control device 30 is equipped with inlet valves 31, outlet valves 32, and check valves 33.

Two inlet valves 31 are provided on two hydraulic passages that lead from the first main hydraulic passage 2a to two wheel brakes BR, respectively, and the other two inlet valves 31 are provided on the other two hydraulic passages that lead from the second main hydraulic passage 2b to the other two wheel brakes BR, respectively.

Each inlet valve 31 is a normally open linear solenoid valve, and its opening pressure can be adjusted according to the current flowing through its coil.

Being open during an ordinary operation, the inlet valves 31 allow the slave cylinder 20 to give hydraulic pressures to the respective wheel cylinders W. When the wheels are about to lock, the inlet valves 31 are closed by control of the electronic control unit 90 and thereby prevent application of hydraulic pressures to the respective wheel cylinders W.

The outlet valves 32 are normally closed solenoid valves that are disposed between the respective wheel cylinders W and the return hydraulic passage 74.

The outlet valves 32, which are closed during an ordinary operation, are opened by control of the electronic control unit 90 when the wheels are about to lock.

The check valves 33 are connected to the respective inlet valves 31 in parallel. The check valves 33 are valves for allowing only inflow of brake fluid from the wheel cylinder W side to the slave cylinder 20 side (master cylinder 10 side). Thus, even while the input valves 31 are closed, the check valves 33 allow flow of brake fluid from the wheel cylinder W side to the slave cylinder 20 side.

The electronic control unit 90 is equipped with a housing 91 which is a resin box and a control board (not shown) which is housed in the housing 91. As shown in FIG. 2, the housing 91 is attached to a right side surface 101d of the base body 100.

As shown in FIG. 1, the electronic control unit 90 controls the operation of the motor 24 and the opening/closure of the valves according to programs etc. stored in advance on the basis of various information acquired from various sensors such as the two pressure sensors 6 and 7 and a stroke sensor (not shown).

Next, how the vehicular brake system A operates will be outlined. In the vehicular brake system A shown in FIG. 1, upon activation of the system A, the two switching valves 51 and 52 are energized and switching is thereby made from the first position to the second position (these positions were described above).

As a result, connection is established between the downstream side of the first main hydraulic passage 2a and the first communication passage 5a and between the downstream side of the second main hydraulic passage 2b and the second communication passage 5b. The master cylinder 10 is disconnected from the wheel cylinders W, and the slave cylinder 20 is connected to the wheel cylinders W.

Upon activation of the system A, the normally closed solenoid valve 8 provided on the branch hydraulic passage 3 is opened. As a result, a hydraulic pressure that is generated by the master cylinder 10 by a manipulation of the brake pedal P is transmitted to the stroke simulator 40 rather than the wheel cylinders W.

The hydraulic pressure in the pressure room 45 of the stroke simulator 40 is increased and the third piston 42 is moved toward the lid member 44 against the urging forces of the coil springs 43a and 43b, whereby the brake pedal P is allowed to make a stroke and a simulated manipulation reaction force is given to the brake pedal P.

If stepping on the brake pedal P is detected by the stroke sensor (not shown), the electronic control unit 90 drives the motor 24 of the slave cylinder 20, whereby the second piston 22 of the slave cylinder 20 is moved toward its bottom surface 21a. As a result, the pressure of the brake fluid in the pressure room 26 is increased.

The electronic control unit 90 compares a hydraulic pressure occurring in the slave cylinder 20 (i.e., a hydraulic pressure detected by the second pressure sensor 7) with a requested hydraulic pressure that corresponds to a manipulation amount of the brake pedal P, and controls the rotation speed of the motor 24 and other items on the basis of a comparison result.

In this manner, the vehicular brake system A raises the hydraulic pressure according to the manipulation amount of the brake pedal P. The hydraulic pressure generated by the slave cylinder 20 is applied to the hydraulic control device 30.

When the stepping on the brake pedal P is canceled, the electronic control unit 90 drives the motor 24 of the slave cylinder 20 in the reverse direction, whereby the second piston 22 is returned toward the motor 24 by the coil spring 23 and the pressure in the pressure room 26 is lowered.

If the detection value of the second pressure sensor 7 does not increase to a judgment reference value in the state that the motor 24 of the slave cylinder 20 is being driven, the electronic control unit 90 closes the two shutoff valves 61 and 62 and drives the slave cylinder 20 so as to increase its pressure.

If the detection value of the second pressure sensor 7 still does not increase, the electronic control unit 90 controls the valves so that the hydraulic pressure directly acts on the wheel cylinders W from the master cylinder 10 because there is a possibility that decrease of brake fluid is occurring in the paths located on the slave cylinder 20 side of the two shutoff valves 61 and 62.

If the detection value of the second pressure sensor 7 has increased when the slave cylinder 20 has been driven so as to increase its pressure with the two shutoff valves 61 and 62 closed, the electronic control unit 90 closes the first shutoff valve 61 and opens the second shutoff valve 62 and drives the slave cylinder 20 so as to increase its pressure.

If the detection value of the second pressure sensor 7 has increased resultantly, the electronic control unit 90 continues the elevation of the hydraulic pressure by the slave cylinder 20 through the second main hydraulic passage 2b because there is a possibility that decrease of brake fluid is occurring in the first main hydraulic passage 2a.

On the other hand, if the detection value of the second pressure sensor 7 does not increase even if the electronic control unit 90 has driven the slave cylinder 20 so as to increase its pressure with the first shutoff valve 61 closed and the second shutoff valve 62 opened, the electronic control unit 90 opens the first shutoff valve 61 and closes the second shutoff valve 62 and drives the slave cylinder 20 so as to increase its pressure.

If the detection value of the second pressure sensor 7 has increased resultantly, the electronic control unit 90 continues the elevation of the hydraulic pressure by the slave cylinder 20 through the first main hydraulic passage 2a because there is a possibility that decrease of brake fluid is occurring in the second main hydraulic passage 2b.

In the hydraulic control device 30, the wheel cylinder pressures of the respective wheel cylinders W are adjusted by the electronic control unit 90's controlling the open/closed states of the inlet valves 31 and the outlet valves 32.

For example, if the brake pedal P is stepped on in an ordinary state that the inlet valves 31 are open and the outlet valves 32 are closed, a hydraulic pressure generated by the slave cylinder 20 is transmitted to the wheel cylinders W as it is and the wheel cylinder pressures are raised.

In a state that the inlet valves 31 are closed and the outlet valves 32 are open, brake fluid flows out of the wheel cylinders W to the return hydraulic passage 74 and the wheel cylinder pressures lower.

In a state that the inlet valves 31 and the outlet valves 32 are both closed, the wheel cylinder pressures are maintained.

In a state that the slave cylinder 20 does not operate (e.g., in an ignition-off state or a state that no electric power is obtained), the first switching valve 51, the second switching valve 52, and the normally closed solenoid valve 8 are returned to their initial states. As a result, connection is established between the upstream side and the downstream side of each of the main hydraulic passages 2a and 2b. In this state, a hydraulic pressure generated by the master cylinder 10 is transmitted to the wheel cylinders W via the hydraulic control device 30.

Next, a description will be made of the arrangement of the master cylinder 10, the slave cylinder 20, the stroke simulator 40, the hydraulic control device 30, and the electronic control unit 90 in the hydraulic pressure generation apparatus 1 according to the embodiment. In the following, the arrangement of the above devices in a state that the hydraulic pressure generation apparatus 1 is installed in a vehicle will be described.

Figure 3:
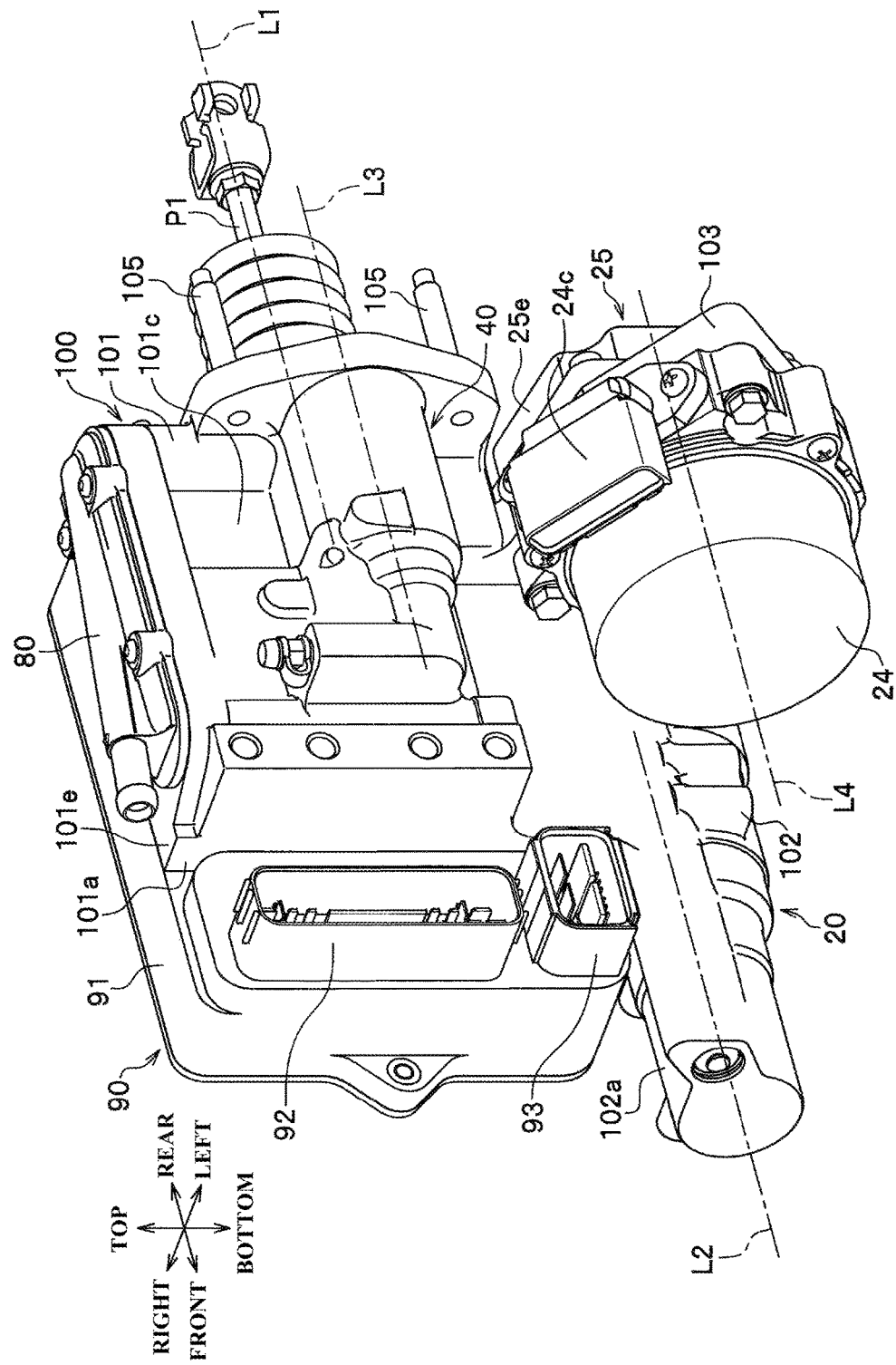
FIG. 3 is a perspective view of the hydraulic pressure generation apparatus according to the embodiment as viewed from a top-front-left position.

As shown in FIGS. 2 and 3, a top portion 101 of the base body 100 employed in the embodiment is approximately shaped like a cuboid. As shown in FIG. 7, the top portion 101 is formed with the first cylinder hole 11 and the third cylinder hole 41. As shown in FIG. 2, the reservoir tank 80 is attached to the top surface 101e of the top portion 101.

Figure 5:
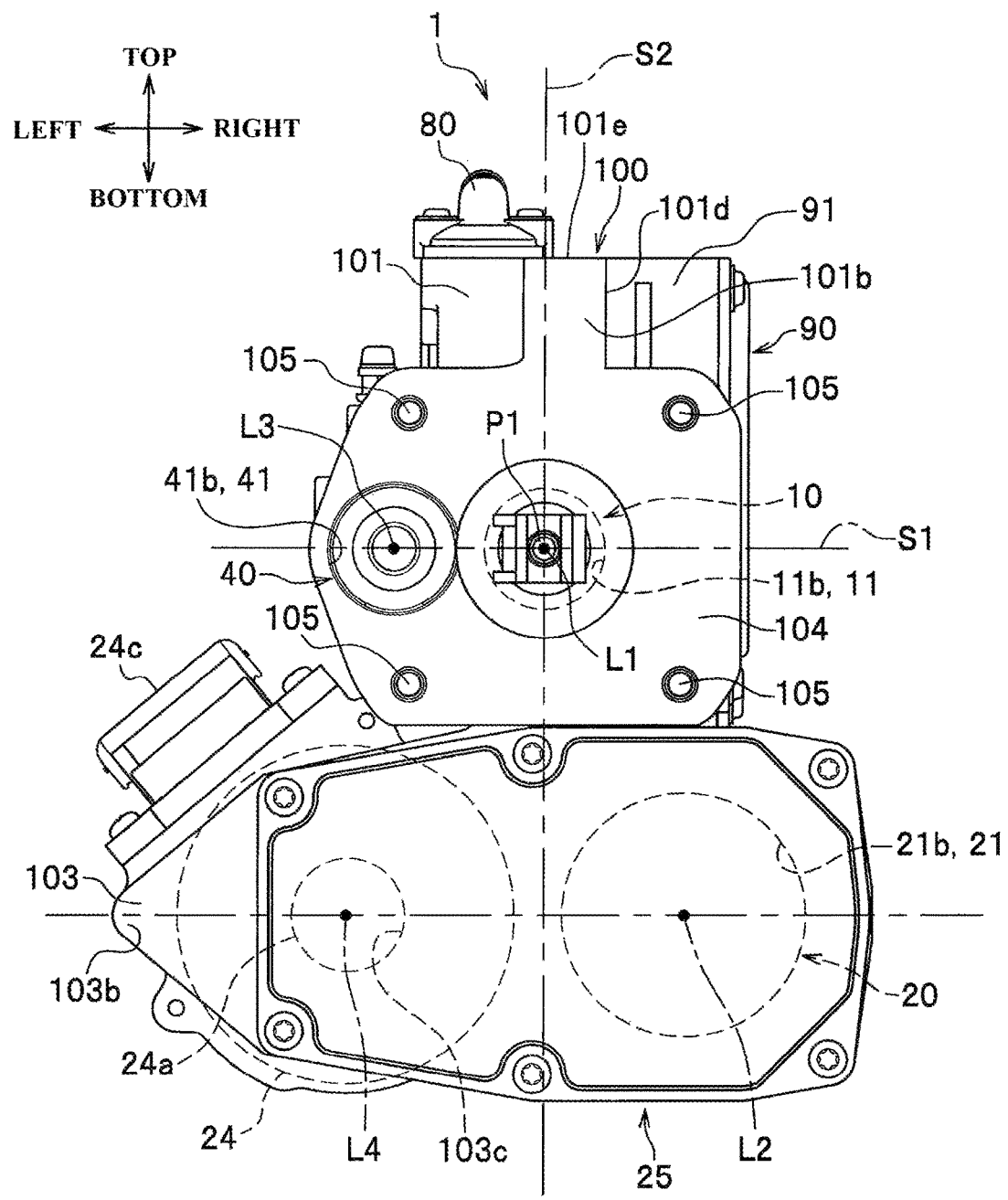
FIG. 5 is a rear view of the hydraulic pressure generation apparatus according to the embodiment.
Figure 6:
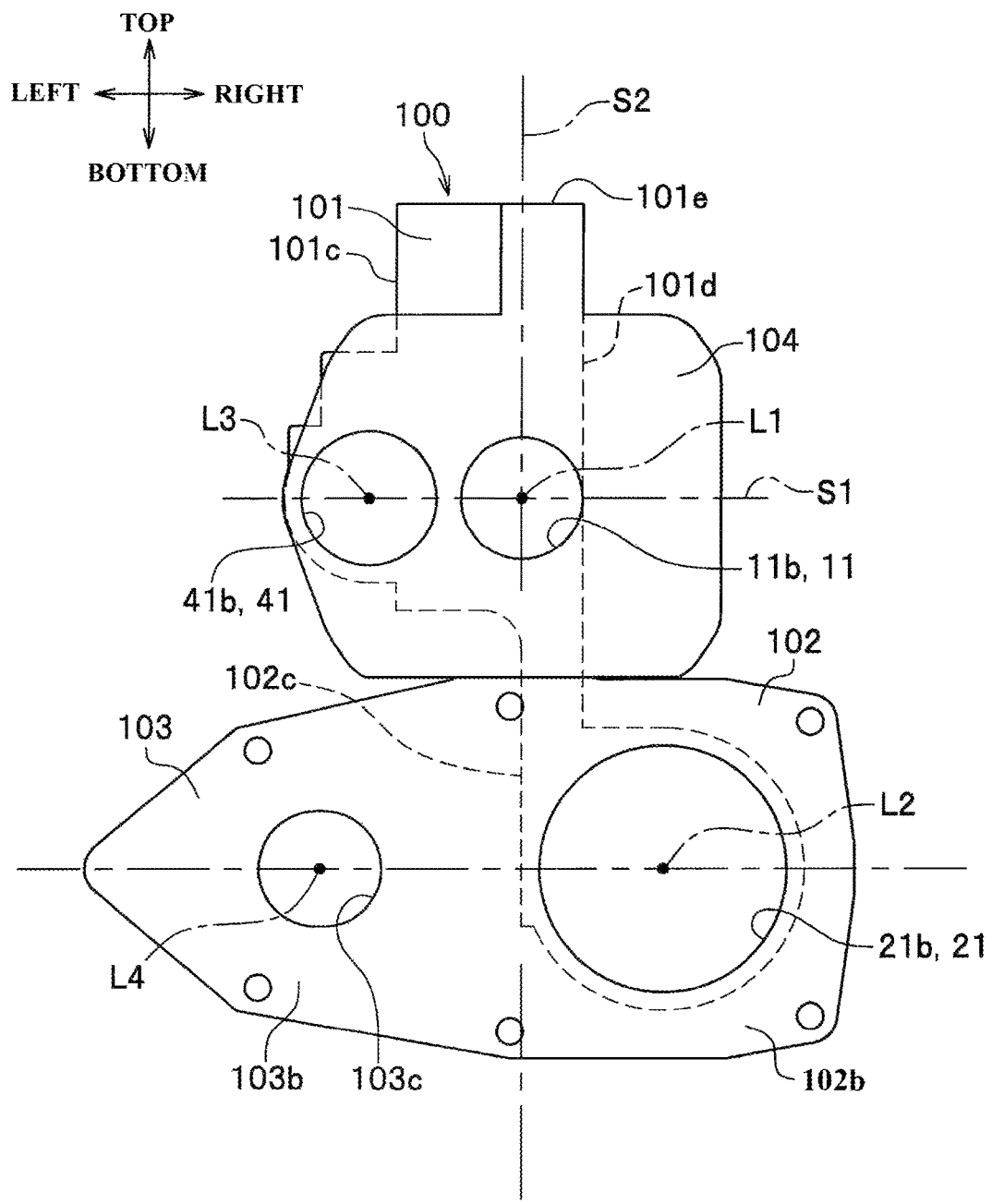
FIG. 6 is a rear view of a base body of the hydraulic pressure generation apparatus according to the embodiment.

As shown in FIGS. 5 and 6, the first cylinder hole 11 of the master cylinder 10 is formed in the top portion 101 of the base body 100 at the center in both of the top-bottom direction and the left-right direction.

The first cylinder hole 11 is a cylindrical hole having a closed bottom. As shown in FIG. 7, the axial line L1 of the first cylinder hole 11 extends in the front-rear direction. The first cylinder hole 11 has an opening at the rear end, that is, in the rear surface 101b of the top portion 101. That is, the first cylinder hole 11 is open to the rear side.

As shown in FIG. 4, the rear surface 101b of the top portion 101 of the base body 100 has a vehicle body attachment surface 104, which is a surface that is attached the front surface of a dashboard B which is a boundary between an engine room and a vehicle compartment.

As shown in FIG. 5, the opening 11b of the first cylinder hole 11 is formed in the vehicle body attachment surface 104 at the center. Four stud bolts 105 are erected from the vehicle body attachment surface 104 at four corner positions.

To attach the base body 100 to the dashboard B, as shown in FIG. 4 the stud bolts 105 are inserted into respective attachment holes (not shown) of the dashboard B from the engine room side (from the left side in FIG. 4). And tip portions of the stud bolts 105 are attached to a vehicle body frame (not shown) on the side of the vehicle compartment (on the right side in FIG. 4). In this manner, the base body 100 can be fixed to the front surface of the dashboard B.

As shown in FIGS. 5 and 6, the top portion 101 of the base body 100 is formed with the third cylinder hole 41 of the stroke simulator 40 on the left of the first cylinder hole 11. The third cylinder hole 41 is a cylindrical hole having a closed bottom. As shown in FIG. 7, the axial line L3 of the third cylinder hole 41 extends in the front-rear direction.

The axial line L3 of the third cylinder hole 41 is parallel with the axial line L1 of the first cylinder hole 11. Thus, the first cylinder hole 11 and the third cylinder hole 41 are arranged side by side and parallel with each other. As shown in FIG. 6, the axial line L3 of the third cylinder hole 41 and the axial line L1 of the first cylinder hole 11 are arranged in the left-right direction in a horizontal reference plane S1 (imaginary plane).

The interval between the first cylinder hole 11 and the third cylinder hole 41 is set smaller than the radius of the first cylinder hole 11, and the first cylinder hole 11 and the third cylinder hole 41 are arranged adjacent to each other in the left-right direction. The diameter of the first cylinder hole 11 is smaller than that of the third cylinder hole 41.

The third cylinder hole 41 has an opening in the rear surface 101b of the top portion 101 of the base body 100. That is, the third cylinder hole 41 is open to the rear side.

As shown in FIG. 3, an approximately left half circumferential wall of the third cylinder hole 41 projects leftward from a left side surface 101c of the top portion 101.

As shown in FIG. 6, a bottom portion 102 of the base body 100 is continuous with its top portion 101 and projects rightward with respect to a right side surface 101d of the top portion 101. A left side surface 102c of the bottom portion 102 is offset rightward from the left side surface 101c of the top portion 101.

As shown in FIG. 7, the rear surface 102b of the bottom portion 102 is offset forward from the rear surface 101b (vehicle body attachment surface 104) of the top portion 101. A front portion 102a of the bottom portion 102 projects forward with respect to a front surface 101a of the top portion 101.

As shown in FIGS. 5 and 6, the bottom portion 102 of the base body 100 is formed with the second cylinder hole 21 of the slave cylinder 20. The second cylinder hole 21 is a cylindrical hole having a closed bottom. As shown in FIG. 7, the axial line L2 of the second cylinder hole 21 extends in the front-rear direction.

As shown in FIG. 6, the second cylinder hole 21 is located below the first cylinder hole 11 and the third cylinder hole 41 on the bottom-right of the first cylinder hole 11.

As shown in FIG. 7, the axial line L2 of the second cylinder hole 21 is parallel with the axial lines L1 of the first cylinder hole 11 and the axial lines L3 of the third cylinder hole 41. Thus, the first cylinder hole 11, the second cylinder hole 21, and the third cylinder hole 41 are arranged parallel with each other.

The second cylinder hole 21 has an opening in the rear surface 102b of the bottom portion 102 of the base body 100. That is, the second cylinder hole 21 is open to the rear side.

As shown in FIG. 6, a rear end portion of the bottom portion 102 of the base body 100 is formed with the flange 103 which projects leftward. The flange 103 is a plate-like portion which is erected perpendicularly to the left side surface 102c of the bottom portion 102.

As shown in FIG. 4, the front surface of the flange 103 is a motor attachment surface 103a to which the motor 24 is attached. The rear surface of the flange 103 is a drive power transmission unit attachment surface 103b to which the drive power transmission unit 25 is attached.

The drive power transmission unit attachment surface 103b of the flange 103 is continuous with the rear surface 102b of the bottom portion 102, and they form the same surface. Like the rear surface 102b of the bottom portion 102, the drive power transmission unit attachment surface 103b is offset forward from the rear surface 101b of the top portion 101. That is, the drive power transmission unit attachment surface 103b is located on the front side of the vehicle body attachment surface 104 of the top portion 101.

The motor 24 is attached to the motor attachment surface 103a of the flange 103. The front end surface of the motor 24 is located in the rear of the front surface 101a of the top portion 101 of the base body 100. The motor 24 is disposed at a position that is close to the center of the base body 100 in the front-rear direction.

The insertion hole 103c penetrates through the flange 103 in the front-rear direction. The output shaft 24a which projects rearward from the rear surface of the motor 24 is inserted through the insertion hole 103c and projects rearward past the drive power transmission unit attachment surface 103b.

As shown in FIG. 6, the insertion hole 103c of the flange 103 is located below the first cylinder hole 11 and the third cylinder hole 41 on the bottom-left of the first cylinder hole 11. Thus, when the motor 24 is attached to the flange 103, as shown in FIG. 5 its output shaft 24a is located below the first cylinder hole 11 and the third cylinder hole 41 on the bottom-left of the first cylinder hole 11.

In a state that the motor 24 is attached to the flange 103, as shown in FIG. 4, the axial line L4 of the output shaft 24a extends in the front-rear direction.

The axial line L4 of the output shaft 24a is parallel with the axial lines L1, L2, and L3 of the cylinder holes 11, 21, and 41. Thus, the output shaft 24a is parallel with the cylinder holes 11, 21, and 41. As shown in FIG. 5, the axial line L4 of the output shaft 24a and the axial line L2 of the second cylinder hole 21 are arranged side by side in the left-right direction in a horizontal plane.

As shown in FIG. 1, components of the drive power transmission unit 25 are attached to the rear surface 102b of the bottom portion 102 of the base body 100 and the drive power transmission unit attachment surface 103b of the flange 103.

As shown in FIG. 4, the forward offset of the rear surface 102b of the bottom portion 102 and the drive power transmission unit attachment surface 103b of the flange 103 from the vehicle body attachment surface 104 of the top portion 101 is set so that the rear end of the cover member 25e of the drive power transmission unit 25 does not project rearward with respect to the vehicle body attachment surface 104.

Thus, when the vehicle body attachment surface 104 of the base body 100 is attached to the dashboard B, the cover member 25e of the drive power transmission unit 25 is set between the front surface of the dashboard B and the drive power transmission unit attachment surface 103b of the flange 103 of the base body 100, and the drive power transmission unit 25 does not contact the dashboard B.

As shown in FIG. 7, the right side surface 101d of the top portion 101 of the base body 100 is formed with plural attachment holes 110 for mounting of the various kinds of valves 51, 52, 61, 62, 8, 31, and 32 (see FIG. 1) and the two pressure sensors 6 and 7 (see FIG. 1).

As shown in FIG. 2, the housing 91 of the electronic control unit 90 is attached the right side surface 101d of the top portion 101. The various kinds of valves 51, 52, 61, 62, 8, 31, and 32 and the two pressure sensors 6 and 7 which are mounted in the respective attachment holes 110 (see FIG. 7) are covered with the housing 91.

The housing 91 is disposed over the second cylinder hole 21. Thus, as shown in FIG. 5, the housing 91 and the slave cylinder 20 are arranged in the top-bottom direction on the right of the top portion 101 of the base body 100.

As shown in FIG. 3, a front portion of the housing 91 projects forward with respect to the front surface 101a of the top portion 101 of the base body 100. A left side surface of the front portion of the housing 91 is formed with an external connection connector 92 and a motor connection connector 93.

The external connection connector 92 is a connector to which a connector that is provided at one end of an external wiring cable (not shown) is to be connected. The external connection connector 92 is disposed in front of the front surface 101a of the top portion 101.

The motor connection connector 93 is disposed under the external connection connector 92. The motor connection connector 93 is a connector to be connected to a motor connector 24c of the motor 24 by a cable (not shown).

In the hydraulic pressure generation apparatus 1 according to the embodiment, as shown in FIG. 5, the second cylinder hole 21 and the motor 24 (output shaft 24a) are located under the horizontal reference plane S1 (imaginary plane) which includes the axial line L1 of the first cylinder hole 11 and the axial line L3 of the third cylinder hole 41.

The third cylinder hole 41 and the motor 24 (output shaft 24a) are located on the left of a vertical reference plane S2 (imaginary plane) which includes the axial line L1 of the first cylinder hole 11. The second cylinder hole 21 is located on the right of the vertical reference plane S2.

As described above, in the hydraulic pressure generation apparatus 1, the second cylinder hole 21 and the motor 24 are located below the first cylinder hole 11 on the right and left of the vertical reference plane S2 including the axial line L1 of the first cylinder hole 11, respectively.

Thus, when the hydraulic pressure generation apparatus 1 is viewed from the front side or the rear side, the center (axial line L1) of the first cylinder hole 11, the center (axial line L2) of the second cylinder hole 21, and the center (axial line L4) of the output shaft 24a have such a positional relationship that lines connecting them form a triangle. That is, when the hydraulic pressure generation apparatus 1 is viewed from the front side or the rear side, the first cylinder hole 11 (master cylinder 10) is located at the top apex of the triangle and the second cylinder hole 21 (slave cylinder 20) and the output shaft 24a (motor 24) are located at the ends of the base of the triangle in the left-right direction, respectively.

In the hydraulic pressure generation apparatus 1, as shown in FIG. 4, the axial lines L1, L2, and L3 of the cylinder holes 11, 21, and 41 and the axial line L4 of the output shaft 24a of the motor 24 are arranged parallel with each other, whereby the cylinder holes 11, 21, and 41 and the motor 24 are arranged in a well-balanced manner.

In the hydraulic pressure generation apparatus 1 according to the embodiment, the three cylinder holes 11, 21, and 41 of the master cylinder 10, the slave cylinder 20, and the stroke simulator 40 have the respective openings on the same side and the output shaft 24a of the motor 24 projects toward the same side as the side on which the cylinder holes 11, 21, and 41 have the openings.

As a result, in the hydraulic pressure generation apparatus 1, the cylinder holes 11, 21, and 41 can be formed in the base body 100 by machining from one direction (from the rear side). Various components can be set in or attached to the cylinder holes 11, 21, and 41 and the output shaft 24a from one direction (from the rear side).

Since the efficiency of machining work for forming the cylinder holes 11, 21, and 41 in the base body 100 and the efficiency of work of setting or attaching various components in or to the cylinder holes 11, 21, and 41 and the output shaft 24a can be increased, the efficiency of manufacture of the hydraulic pressure generation apparatus 1 can be made higher.

In the hydraulic pressure generation apparatus 1 according to the embodiment, as shown in FIG. 5, the slave cylinder 20 and the motor 24 are located below the master cylinder 10 on the right and left of the master cylinder 10, respectively, whereby the center of gravity of the hydraulic pressure generation apparatus 1 is set low. In particular, since the motor 24 which is a heavy component is disposed at a low position in the hydraulic pressure generation apparatus 1, the weight balance of the master cylinder 10, the slave cylinder 20, and the motor 24 can be made stable and hence the stability of the hydraulic pressure generation apparatus 1 can be enhanced effectively.

In the hydraulic pressure generation apparatus 1 according to the embodiment, as shown in FIG. 4, the drive power transmission unit 25 is attached to the rear surface (drive power transmission unit attachment surface 103*b*) of the flange 103 of the base body 100 and the motor 24 is attached to the front surface (motor attachment surface 103*a*) of the flange 103. The motor 24 and the drive power transmission unit 25 are thus arranged in a well-balanced manner with respect to the base body 100, whereby the stability of the hydraulic pressure generation apparatus 1 can be enhanced.

In the hydraulic pressure generation apparatus 1 according to the embodiment, the housing 91 and the slave cylinder 20 are arranged in the top-bottom direction, the space concerned around the base body 100 is utilized effectively, whereby the hydraulic pressure generation apparatus 1 can be miniaturized.

In the hydraulic pressure generation apparatus 1 according to the embodiment, since the first cylinder hole 11 and the third cylinder hole 41 are arranged adjacent to each other in the left-right direction in a horizontal plane, the master cylinder 10 can be linked to the stroke simulator 40 easily. Since the master cylinder 10 and the stroke simulator 40 are arranged compactly, the hydraulic pressure generation apparatus 1 can be miniaturized.

In the hydraulic pressure generation apparatus 1 according to the embodiment, as shown in FIG. 4, when the vehicle body attachment surface 104 of the base body 100 is attached to the dashboard B, the cover member 25*e* of the drive power transmission unit 25 is set between the dashboard B and the drive power transmission unit attachment surface 103*b* of the base body 100, and the drive power transmission unit 25 does not contact the dashboard B. This makes it easier to secure a space for installation of the hydraulic pressure generation apparatus 1 in a vehicle.

Although the embodiment has been described above, the invention is not limited to the embodiment and modifications can be made as appropriate without departing from the spirit and scope of the invention.

In the hydraulic pressure generation apparatus 1 according to the embodiment, as shown in FIG. 5, in a state that it is installed in a vehicle, the second cylinder hole 21 and the output shaft 24*a* are arranged side by side in the left-right direction below the first cylinder hole 11. However, the manner of arrangement of the cylinder holes 11, 21, and 41 and the output shaft 24*a* is not limited to this arrangement.

For example, the second cylinder hole 21 and the output shaft 24*a* may be disposed above the first cylinder hole 11. In this case, when the hydraulic pressure generation apparatus 1 is viewed from the front side or the rear side, the center of the first cylinder hole 11, the center of the second cylinder hole 21, and the center of the output shaft 24*a* have such a positional relationship that lines connecting them form an inverted triangle.

Although in the hydraulic pressure generation apparatus 1 according to the embodiment the cylinder holes 11, 21, and 41 have the respective openings in the rear surfaces 101*b* and 102*b* of the base body 100, the cylinder holes 11, 21, and 41 may have openings in such a manner that one or two of them are located on the front side while the other is or are located on the rear side.

In the hydraulic pressure generation apparatus 1 according to the embodiment, as shown in FIG. 4, the output shaft 24*a* projects rearward from the motor 24. Alternatively, the motor 24 may be disposed in such a manner that the output shaft 24*a* projects forward from the motor 24.

For example, a configuration is possible in which the motor 24 is disposed in the rear of the drive power transmission unit 25 and the output shaft 24*a* that projects forward from the motor 24 is connected to the drive power transmission unit 25. In this manner, the slave cylinder 20, the drive power transmission unit 25, and the motor 24 may be arranged straightly.

In the hydraulic pressure generation apparatus 1 according to the embodiment, as shown in FIG. 5, the housing 91 is disposed over the second cylinder hole 21. Alternatively, the housing 91 may be disposed below the second cylinder hole 21.

In the hydraulic pressure generation apparatus 1 according to the embodiment, as shown in FIG. 1, the master cylinder 10 is of a tandem piston type cylinder. Alternatively, the master cylinder 10 may be a single piston type cylinder.

Although in the hydraulic pressure generation apparatus 1 according to the embodiment the slave cylinder 20 is a single piston type cylinder, it may be a tandem piston type cylinder.

Although in the hydraulic pressure generation apparatus 1 according to the embodiment the master cylinder 10, the stroke simulator 40, the slave cylinder 20, and the hydraulic control device 30 are provided in the base body 100, among these devices only the master cylinder 10 and the slave cylinder 20 may be provided in the base body 100.

Although in the hydraulic pressure generation apparatus 1 according to the embodiment the axial lines L1, L2, and L3 of the cylinder holes 11, 21, and 41 and the axial line L4 of the output shaft 24*a* of the motor 24 are arranged parallel with each other, the axial lines L1, L2, L3, and L4 may be inclined from each other a little. Thus, in the invention, the axial lines L1, L2, and L3 of the cylinder holes 11, 21, and 41 and the axial line L4 of the output shaft 24*a* of the motor 24 are arranged approximately parallel with each other.

The invention claimed is:

1. A hydraulic pressure generation apparatus, including:
   a base body;
   a motor attached to the base body;
   a master cylinder which generates a brake hydraulic pressure by a first piston which is linked to a brake manipulator; and
   a slave cylinder which generates a brake hydraulic pressure by a second piston which has the motor as a drive source,
   wherein the base body includes:
      a first cylinder hole having a closed bottom in which the first piston is inserted; and
      a second cylinder hole having a closed bottom in which the second piston is inserted,
   wherein the first cylinder hole and the second cylinder hole have respective openings within the base body located on a first side of the base body, and
   wherein an axial line of the first cylinder hole, an axial line of the second cylinder hole, and an axial line of an output shaft of the motor are arranged approximately parallel with each other.

2. The hydraulic pressure generation apparatus of claim 1, further including:
   a stroke simulator which gives a simulated manipulation reaction force to the brake manipulator by a third piston in an urged state,
   wherein the base body further includes a third cylinder hole having a bottom and in which the third piston is inserted, wherein the third cylinder hole has an opening within the base body located on the first side of the base body, and wherein an axial line of the third cylinder hole is approximately parallel with the axial line of the first cylinder hole.

3. The hydraulic pressure generation apparatus of claim 2, wherein the third cylinder hole is disposed beside the first cylinder hole.

4. The hydraulic pressure generation apparatus of claim 1, wherein the second cylinder hole and the output shaft are disposed above or below the first cylinder hole.

5. The hydraulic pressure generation apparatus of claim 4, wherein the output shaft is disposed beside the second cylinder hole.

6. The hydraulic pressure generation apparatus of claim 1, wherein the output shaft projects from the motor toward the first side.

7. The hydraulic pressure generation apparatus of claim 1, wherein a surface of the base body located on the first side of the base body includes a vehicle body attachment surface and a drive power transmission unit attachment surface, wherein a drive power transmission unit which converts rotational drive power of the output shaft into straight axial power for the second piston is attached to the drive power transmission unit attachment surface, and wherein the drive power transmission unit attachment surface is located facing a same direction as the vehicle body attachment surface.

8. The hydraulic pressure generation apparatus of claim 7, wherein a flange projects from the base body, wherein a surface of the flange located on the first side of the base body includes the drive power transmission unit attachment surface, and wherein the motor is attached to a surface of the flange located on a second side of the base body.

9. The hydraulic pressure generation apparatus of claim 1, wherein a housing of a control device which controls the motor is attached to the base body, and wherein the housing is disposed above or below the second cylinder hole.

10. A hydraulic pressure generation apparatus, including:
a base body;
a motor attached to the base body;
a master cylinder which generates a brake hydraulic pressure by a first piston which is linked to a brake manipulator; and
a slave cylinder which generates a brake hydraulic pressure by a second piston which has the motor as a drive source,
wherein the base body includes:
a first cylinder hole having a closed bottom in which the first piston is inserted; and
a second cylinder hole having a closed bottom in which the second piston is inserted, wherein an axial line of the first cylinder hole, an axial line of the second cylinder hole, and an axial line of an output shaft of the motor are arranged approximately parallel with each other, wherein a first side of the base body includes a vehicle body attachment surface and a drive power transmission unit attachment surface, wherein a drive power transmission unit which converts rotational drive power of the output shaft into straight axial power for the second piston is attached to the drive power transmission unit attachment surface, and wherein the drive power transmission unit attachment surface is located facing a same direction as the vehicle body attachment surface.

11. The hydraulic pressure generation apparatus of claim 10,
wherein a flange projects from the base body,
wherein a surface of the flange located on the first side of the base body includes the drive power transmission unit attachment surface, and
wherein the motor is attached to a surface of the flange located on a second side of the base body, and the output shaft projects from the motor toward the first side.

12. The hydraulic pressure generation apparatus of claim 10, further including:
a stroke simulator which gives a simulated manipulation reaction force to the brake manipulator by a third piston in an urged state,
wherein the base body further includes a third cylinder hole having a bottom and in which the third piston is inserted,
wherein an axial line of the third cylinder hole is approximately parallel with the axial line of the first cylinder hole, and
wherein the first cylinder hole, the second cylinder hole, and the third cylinder hole have respective openings in the base body located on the first side of the base body.

13. The hydraulic pressure generation apparatus of claim 12,
wherein the third cylinder hole is disposed beside the first cylinder hole.

14. The hydraulic pressure generation apparatus of claim 10,
wherein the second cylinder hole and the output shaft are disposed above or below the first cylinder hole.

15. The hydraulic pressure generation apparatus of claim 14,
wherein the output shaft is disposed beside the second cylinder hole.

16. The hydraulic pressure generation apparatus of claim 10,
wherein a housing of a control device which controls the motor is attached to the base body, and
wherein the housing is disposed above or below the second cylinder hole.

* * * * *